Patented Apr. 7, 1936

2,036,480

UNITED STATES PATENT OFFICE 2,036,480

PRINTING INK

Felix Kaufler and Hilger Peter Schmitz, Munich, Germany, assignors to Dr. Alexander Wacker Gesellschaft fur Elektrochemische Industrie, Munich, Germany, a corporation No Drawing. Application October 19, 1931, Serial No. 569,846. In Germany April 2, 1931

6 Claims. (Cl. 134—35)

This invention relates to printing ink and has for its object to produce an ink which will not have the undesirable property of evolving objectionable vapors found in present commercial printing inks.

In the manufacture of printing ink, it has been customary to use benzene hydrocarbons as the liquid component, but such use presents the disadvantage that any evolved vapors are poisonous. It has also been suggested that paraffin hydrocarbons having approximately the same boiling point as benzene hydrocarbons, that is, between 80° C. and 175° C., may be used, but the product is unsuitable for printing.

We have now found that volatile liquid paraffin hydrocarbons boiling between 80° C. and 175° C. may be used in printing ink, without the disadvantages previously found, by adding a small amount of a liquid mono or polyhydric alcohol and their liquid esters and ethers, liquid derivatives of alcohols containing a chain of 3 to 7 carbon atoms, for example, propyl alcohol, butanol, amyl alcohol, hexanol and heptanol, liquid volatile, miscible, neutral aliphatic compounds with a chain of three to seven carbon atoms having hydrogen and oxygen, or liquid, volatile, miscible aliphatic compounds with a chain of two carbon atoms having hydrogen and two oxygen atoms.

The following example illustrates the present invention, but it is understood that other solvents, and one or more of the different components stated may be used.

The liquid component of the printing ink was composed of 95 grams of benzine having for instance a boiling range of 100°–140° C. and at least one of the following components:

| | Grams |
|---|---|
| Butanol | 3 |
| Dibutyl ether | 3 |
| Amyl acetate and 2 grams butanol | 3 |
| Mono-ethyl ether of butylene glycol | 3 |
| Ethylene glycol mono-ethyl ether | 8 |
| Butyl acetate and 3 grams benzene | 2 |
| Cyclohexanol acetate | 4 |
| Ethyl lactate | 4 |
| Ethyl glycollate | 5 |
| Butanol and 3 grams ethyl acetate | 3 |
| Ethylene glycol mono-ethyl-ether and 2 grams of butylene glycol | 2 |
| Dibutyl ether, 2 grams ethyl propionate and 3 grams butanol | 1 |
| Propyl acetate and 1 gram propyl alcohol | 4 |

According to the conditions existing during the printing process, the evaporation can be varied as required by adding benzine fractions of different boiling point.

The invention claimed is:

1. A printing ink in which the liquid component is free of substantial amounts of benzene hydrocarbons and contains by weight approximately 95 parts of a volatile liquid paraffin hydrocarbon boiling at from 80° C. to 175° C. and from approximately 3 to 8 parts of a volatile glycol alkyl ether containing a chain of 3-7 carbon atoms.

2. A printing ink in which the liquid component consists of approximately 95 parts by weight of benzine and approximately 3 parts by weight of mono-ethyl ether of butylene glycol.

3. A printing ink in which the liquid component consists of approximately 95 parts by weight of benzine and approximately 3 parts by weight of butanol.

4. A printing ink in which the liquid component consists of approximately 95 parts by weight of benzine and about 4 parts by weight of ethyl lactate.

5. A printing ink in which the liquid component is free of substantial amounts of benzene hydrocarbons and contains by weight approximately 95 parts of benzine and at least one member selected from the group consisting of

| | Parts |
|---|---|
| Butanol | 3 |
| Dibutyl ether | 3 |
| Amyl acetate and 2 parts butanol | 3 |
| Mono-ethyl ether of butylene glycol | 3 |
| Ethylene glycol mono-ethyl ether | 8 |
| Butyl acetate and 3 parts benzene | 2 |
| Cyclohexanol acetate | 4 |
| Ethyl lactate | 4 |
| Ethyl glycollate | 5 |
| Butanol and 3 parts ethyl acetate | 3 |
| Ethylene glycol mono-ethyl ether and 2 parts butylene glycol | 2 |
| Dibutyl ether, 2 parts ethyl propionate and 3 parts butanol | 1 |
| Propyl acetate and 1 part propyl alcohol | 4 |

6. A printing ink in which the liquid component is free of substantial amounts of benzene hydrocarbons and contains by weight approximately 95 parts of a volatile liquid paraffin hydrocarbon boiling from 80° C. to 175° C., and from approximately 3 to 8 parts of at least one member selected from the group of aliphatic compounds consisting of miscible volatile liquid alcohols with a chain of 3 to 7 carbon atoms and the esters and ethers thereof.

FELIX KAUFLER.
HILGER PETER SCHMITZ.